United States Patent
Shimamura

(10) Patent No.: US 12,174,726 B2
(45) Date of Patent: Dec. 24, 2024

(54) VEHICLE APPARATUS INCLUDING VERIFICATION APPARATUS

(71) Applicant: Mitsubishi Electric Corporation, Tokyo (JP)

(72) Inventor: Koji Shimamura, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 62 days.

(21) Appl. No.: 17/796,801

(22) PCT Filed: Feb. 20, 2020

(86) PCT No.: PCT/JP2020/006813
§ 371 (c)(1),
(2) Date: Aug. 1, 2022

(87) PCT Pub. No.: WO2021/166167
PCT Pub. Date: Aug. 26, 2021

(65) Prior Publication Data
US 2023/0050149 A1    Feb. 16, 2023

(51) Int. Cl.
*G06F 11/36* (2006.01)
*G06F 11/07* (2006.01)
(Continued)

(52) U.S. Cl.
CPC ...... *G06F 11/3612* (2013.01); *G06F 11/0739* (2013.01); *G06F 11/0757* (2013.01);
(Continued)

(58) Field of Classification Search
CPC ............ G06F 11/3612; G06F 11/0739; G06F 11/0757; G06F 11/0778; G06F 11/1487;
(Continued)

(56) References Cited

U.S. PATENT DOCUMENTS 9,058,424 B1 * 6/2015 Bienkowski ........ G06F 11/3684
10,606,764 B1 * 3/2020 Kravit ................. G06F 11/1608
(Continued)

FOREIGN PATENT DOCUMENTS

JP        2018-137895 A       8/2018
JP        2019-32656 A        2/2019
WO    WO-2018193548 A1 * 10/2018 .......... G06F 11/3604

OTHER PUBLICATIONS

International Search Report for PCT/JP2020/006813 Aug. 4, 2020 (PCT/ISA/210).

*Primary Examiner* — Bryce P Bonzo
*Assistant Examiner* — Michael Xu
(74) *Attorney, Agent, or Firm* — Sughrue Mion, PLLC; Richard C. Turner

(57) ABSTRACT

The present disclosure relates to a verification apparatus for a vehicle-mounted control apparatus having a first program processing unit that executes a current program, based on an output of a sensor and outputs a processing result to an actuator unit. Because the verification apparatus has a second program processing unit that executes the current program and outputs a processing result, a third program processing unit that shares the output of the sensor unit with the second program processing unit and that executes a new program and outputs a processing result, and a comparison determination unit that compares the respective outputs, it is made possible to perform a regression test effective for the new program at low cost, without affecting operation of the vehicle-mounted control apparatus.

9 Claims, 9 Drawing Sheets

(51) Int. Cl.
*G06F 11/14* (2006.01)
*G06F 11/16* (2006.01)
*G06F 11/22* (2006.01)
*G06F 11/273* (2006.01)
*G06F 11/277* (2006.01)
*G07C 5/08* (2006.01)

(52) U.S. Cl.
CPC ...... *G06F 11/0778* (2013.01); *G06F 11/1487* (2013.01); *G06F 11/1641* (2013.01); *G06F 11/2268* (2013.01); *G06F 11/2736* (2013.01); *G06F 11/277* (2013.01); *G06F 11/3692* (2013.01); *G07C 5/0808* (2013.01)

(58) Field of Classification Search
CPC ............. G06F 11/1641; G06F 11/2268; G06F 11/2736; G06F 11/277; G06F 11/3692; G07C 5/0808
See application file for complete search history.

(56) References Cited

U.S. PATENT DOCUMENTS

| | | | |
|---|---|---|---|
| 10,872,025 B1* | 12/2020 | Wu | G06F 8/75 |
| 2012/0265405 A1* | 10/2012 | Matsumura | B60R 16/0238 |
| | | | 701/1 |
| 2017/0361852 A1* | 12/2017 | Topp | G06F 11/26 |
| 2018/0105183 A1* | 4/2018 | Kollmer | G06F 11/0739 |
| 2019/0087307 A1* | 3/2019 | Zhan | G06F 30/15 |
| 2019/0205231 A1* | 7/2019 | Zhao | G06F 11/3419 |
| 2020/0034280 A1* | 1/2020 | Yonemochi | G06F 11/3688 |
| 2020/0167220 A1* | 5/2020 | Colombo | G06F 11/0757 |
| 2020/0394121 A1* | 12/2020 | Hicks | G06F 11/3676 |
| 2021/0182247 A1* | 6/2021 | Fuksbrumer | G06F 11/3664 |

\* cited by examiner

| TIME[ms] | 0 | 1 | 2 | 3 | 4 | 5 | 6 | 7 | 8 | 9 |
|---|---|---|---|---|---|---|---|---|---|---|
| INPUT SIGNAL VOLTAGE[V] | 0.0 | 30.9 | 58.8 | 80.9 | 95.1 | 100.0 | 95.1 | 80.9 | 58.8 | 30.9 |
| VERIFICATION-PERIOD TIMING[ms] | 0 | – | – | 3 | – | – | 6 | – | – | 9 |

| TIME[ms] | 10 | 11 | 12 | 13 | 14 | 15 | 16 | 17 | 18 | 19 |
|---|---|---|---|---|---|---|---|---|---|---|
| INPUT SIGNAL VOLTAGE[V] | 0.0 | −30.9 | −58.8 | −80.9 | −95.1 | −100 | −95.1 | −80.9 | −58.8 | −30.9 |
| VERIFICATION-PERIOD TIMING[ms] | – | – | 12 | – | – | 15 | – | – | 18 | – |

| TIME[ms] | 20 | 21 | 22 | 23 | 24 | 25 | 26 | 27 | 28 | 29 |
|---|---|---|---|---|---|---|---|---|---|---|
| INPUT SIGNAL VOLTAGE[V] | 0.0 | 30.9 | 58.8 | 80.9 | 95.1 | 100.0 | 95.1 | 80.9 | 58.8 | 30.9 |
| VERIFICATION-PERIOD TIMING[ms] | – | 21 | – | – | 24 | – | – | 27 | – | – |

| TIME[ms] | 30 | 31 | 32 | 33 | 34 | 35 | 36 | 37 | 38 | 39 | 40 |
|---|---|---|---|---|---|---|---|---|---|---|---|
| INPUT SIGNAL VOLTAGE[V] | 0.0 | −30.9 | −58.8 | −80.9 | −95.1 | −100 | −95.1 | −80.9 | −58.8 | −30.9 | 0.0 |
| VERIFICATION-PERIOD TIMING[ms] | 30 | – | – | 33 | – | – | 36 | – | – | 39 | – |

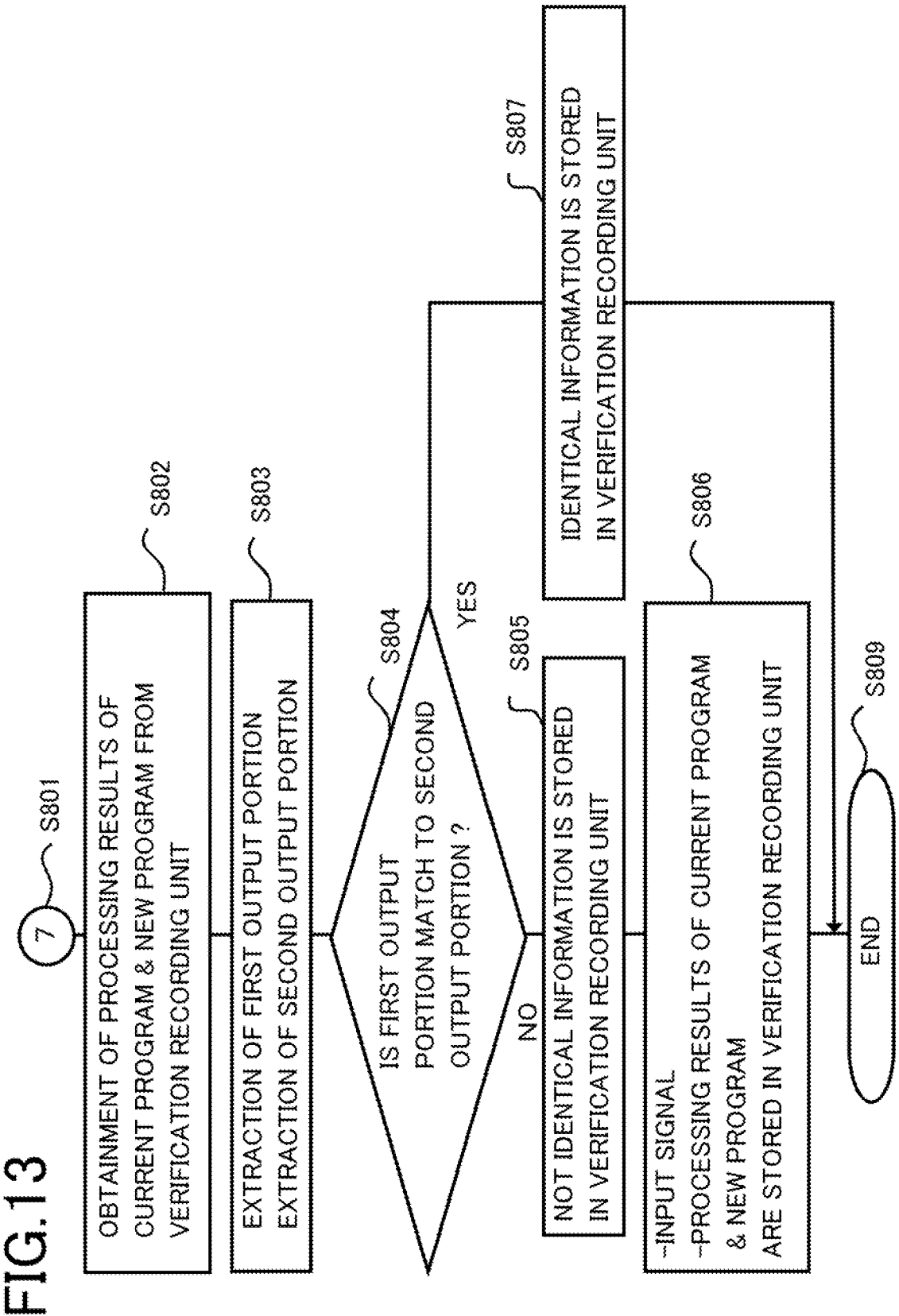

VEHICLE APPARATUS INCLUDING VERIFICATION APPARATUS

CROSS REFERENCE TO RELATED APPLICATIONS

This application is a National Stage of International Application No. PCT/JP2020/006813 filed Feb. 20, 2020.

TECHNICAL FIELD

The present disclosure relates to a verification apparatus.

BACKGROUND ART

In the case where modification such as improvement of software for a vehicle-mounted control apparatus, failure correction, or a specification change due to addition of a function is performed, it is required to implement a regression test for checking whether or not the portions other than that corresponding to the modification function in the same manner as they do with the current software. In this situation, in some cases, a regression test for software is planned by use of input signals from a great number of sensors or a sensor for a large amount of information. In such cases, because the number of combinations of sensor data pieces becomes massive, the regression test takes a long time and the procedure thereof becomes complicated.

Patent Document 1 discloses an obstacle detection apparatus that performs processing based on an input from a sensor mounted in a vehicle and then outputs the result of the processing to an external apparatus and a verification apparatus that performs verification of new software part of which has been changed. The verification apparatus is provided in parallel with the obstacle detection apparatus; by use of a signal from a sensor in the obstacle detection apparatus, the verification apparatus performs processing through new software. The verification apparatus performs a regression test by comparing the output processed by the new software with the output of the obstacle detection apparatus.

Patent Document 2 discloses a control apparatus in which when the processing time of software that performs a calculation in a period of several tens of microseconds becomes long and hence the processing is not completed before the required timing, the processing is changed to processing that requires a short processing time.

CITATION LIST

Patent Literature

Patent Document 1 Japanese Patent Application Laid-Open No. 2019-32656
Patent Document 2 Japanese Patent Application Laid-Open No. 2018-137895

SUMMARY OF INVENTION

Technical Problem

The regression test of software disclosed in Patent Document 1 can be performed by a single computing processing unit provided in a vehicle-mounted apparatus including a vehicle-mounted control apparatus and a verification apparatus. Then, because sharing of input signals from sensors and comparison between the output through the current software and the output through new software can be performed in a single computing processing unit, the vehicle-mounted control apparatus and the verification apparatus can collectively be managed; thus, this method is efficient. Moreover, integration of the vehicle-mounted control apparatus and the verification apparatus can contribute to downsizing and weight saving of all the apparatuses and to the cost reduction.

Some of vehicle-mounted control apparatuses perform processing in a period of several tens of microseconds, as described in Patent Document 2. In the case when processing is performed in such a short period, the regression test of software disclosed in Patent Document 1 is performed by a single computing processing unit provided in the vehicle-mounted apparatus, the software-execution load on the computing processing unit may pose a problem. The computing processing unit needs to execute the current software in parallel with new software obtained by changing part of the current software and then perform comparison between the processing results thereof; thus, the software-execution load may exceed the processing performance of the computing processing unit. When the software-execution load exceeds the processing performance of the computing processing unit, there occurs a problem that the vehicle-mounted control apparatus cannot perform processing through the current software in a predetermined period.

It is made possible that in order to prevent the software-execution load from exceeding the processing ability of the computing processing unit, a computing processing unit having a high processing ability is utilized. However, in this case, because the current software and the new software are executed in a short period, a double software-execution load is imposed on the computing processing unit, a computing processing unit having a higher processing ability is required, resulting in a cost hike.

In addition, the processing for detection of a software failure, disclosed in Patent Document 1, can also be performed by use of the respective separate computing processing units of the vehicle-mounted control apparatus and the verification apparatus. In that case, there exist a case where the vehicle-mounted control apparatus and the verification apparatus are integrated into one unit and a case where they are separated. In each of the foregoing cases, there may be a case where in order to execute the processing in a short time, a computing processing unit having a high processing ability is required. In this situation, it is required that not only the computing processing unit for the vehicle-mounted control apparatus but also the computing processing unit for the verification apparatus is replaced by a high-performance computing processing unit. In the case where a high-performance computing processing unit is adopted only in the vehicle-mounted control apparatus, verification of a regression test cannot be performed successfully. This is because it is required that the current program to be executed in the vehicle-mounted control apparatus and the new program to be executed in the verification apparatus are executed in synchronization with each other and then the respective outputs are compared with each other. Accordingly, because due to speedup of the processing in the vehicle-mounted control apparatus, both the two computing processing units need to have higher functionality, resulting in a cost hike.

Thus, the objective of the present application is to provide a verification apparatus that does not affect the operation of the vehicle-mounted control apparatus where current software is mounted and that can perform a low-cost and effective regression test of new software obtained by changing part of the current software.

Solution to Problem

A verification apparatus according to the present disclosure is a verification apparatus for a vehicle-mounted control apparatus having a sensor unit, a program recording unit in which a current program for controlling a vehicle apparatus is recorded, and a first program processing unit that receives a signal to be outputted from the sensor unit, executes the current program read out from the program recording unit, based on the signal, and then outputs a processing result to the vehicle apparatus; the verification apparatus includes a second program processing unit that receives the signal to be outputted from the sensor unit, executes a program the same as the current program, based on the signal, and then outputs a processing result, a third program processing unit that receives the signal to be outputted from the sensor unit, executes a new program obtained by adding a specification change to the current program, based on the signal, and then outputs a processing result, and a comparison determination unit that compares a first output portion obtained by removing output, in output of the third program processing unit, that is affected by the specification change with a second output portion, in output of the second program processing unit, that corresponds to the first output portion, and then determines identity therebetween.

Advantageous Effects of Invention

Because the verification apparatus according to the present disclosure makes the current software and the new software obtained by changing part of the current software executed in a parallel manner, without affecting the operation of the vehicle-mounted control apparatus in which the current software has been mounted, and compares the respective outputs thereof, an effective regression test can be performed at low cost.

BRIEF DESCRIPTION OF DRAWINGS

FIG. 13 is an eighth flowchart for explaining the processing in the verification apparatus according to Embodiment 2.

DESCRIPTION OF EMBODIMENTS

1. Embodiment 1

Hereinafter, a verification apparatus according to Embodiment 1 will be explained with reference to the drawings.

Figure 1:
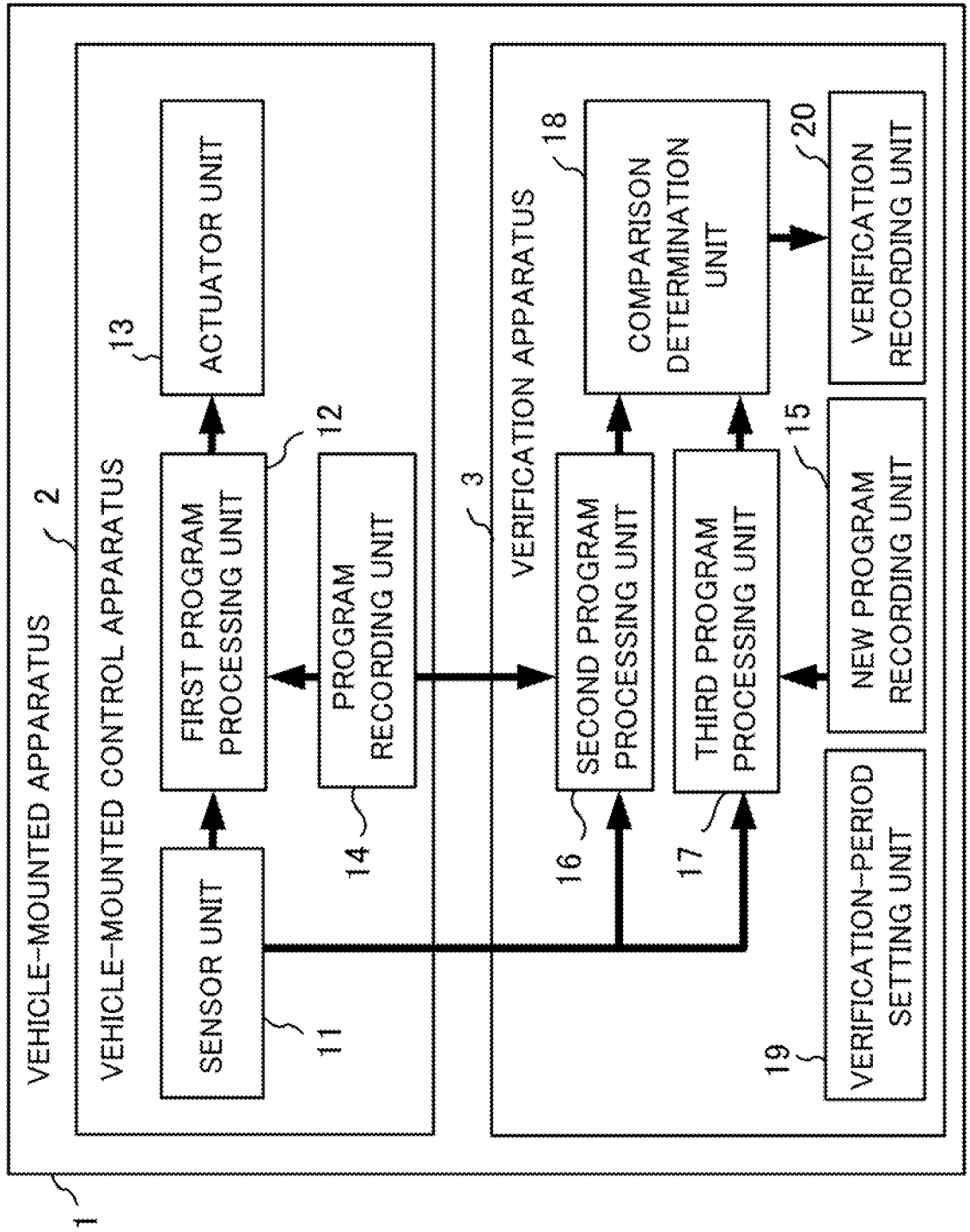
FIG. 1 is a block diagram representing the configuration of a verification apparatus according to Embodiment 1.
Figure 2:
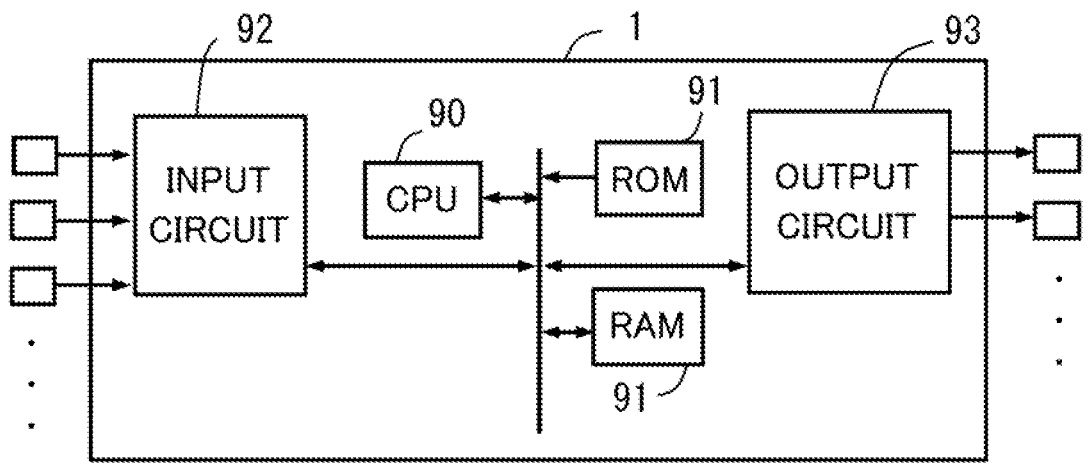
FIG. 2 is a diagram representing the hardware configuration of a vehicle-mounted apparatus according to Embodiment 1.
Figure 3:
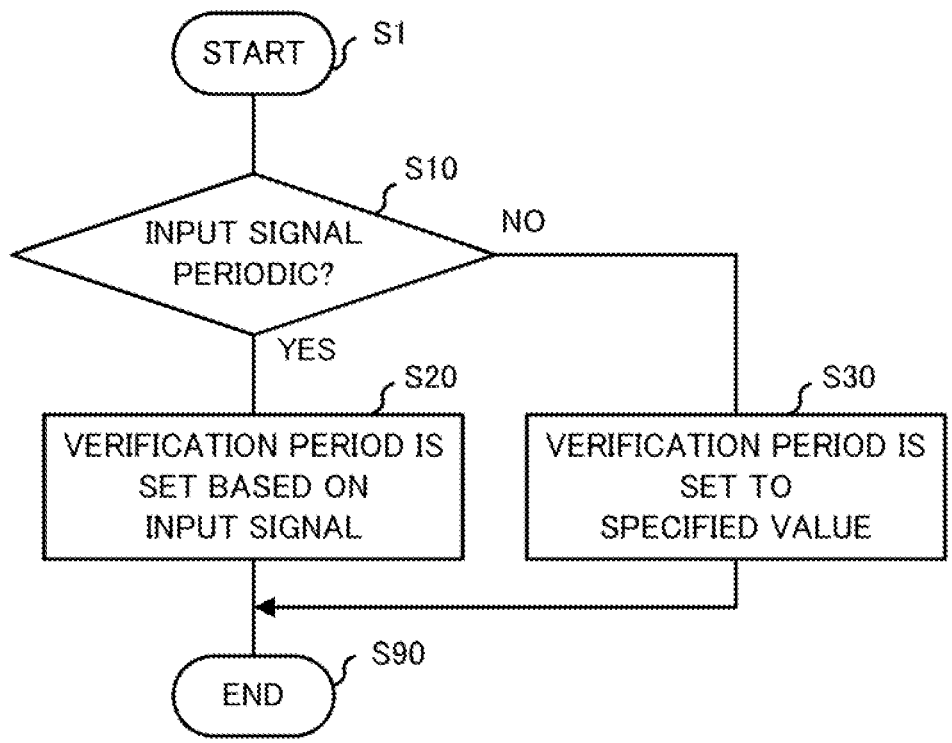
FIG. 3 is a flowchart for explaining verification-period setting in the verification apparatus according to Embodiment 1.
Figure 4:
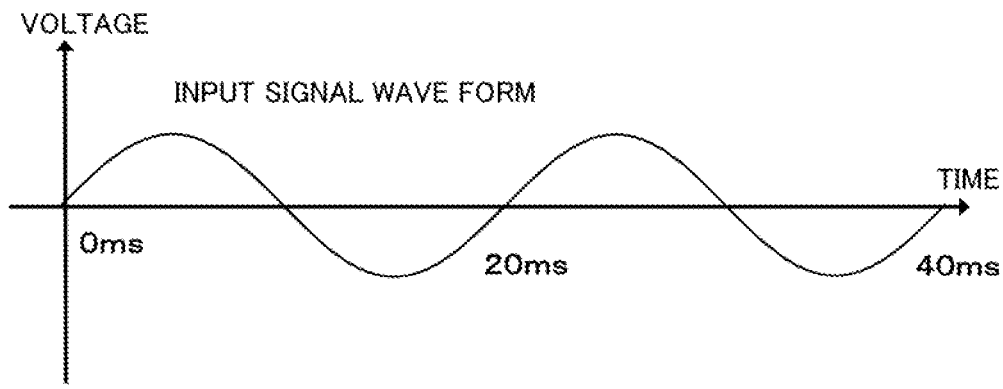
FIG. 4 is a set of drawings for explaining an input signal of the verification apparatus according to Embodiment 1.
Figure 5:
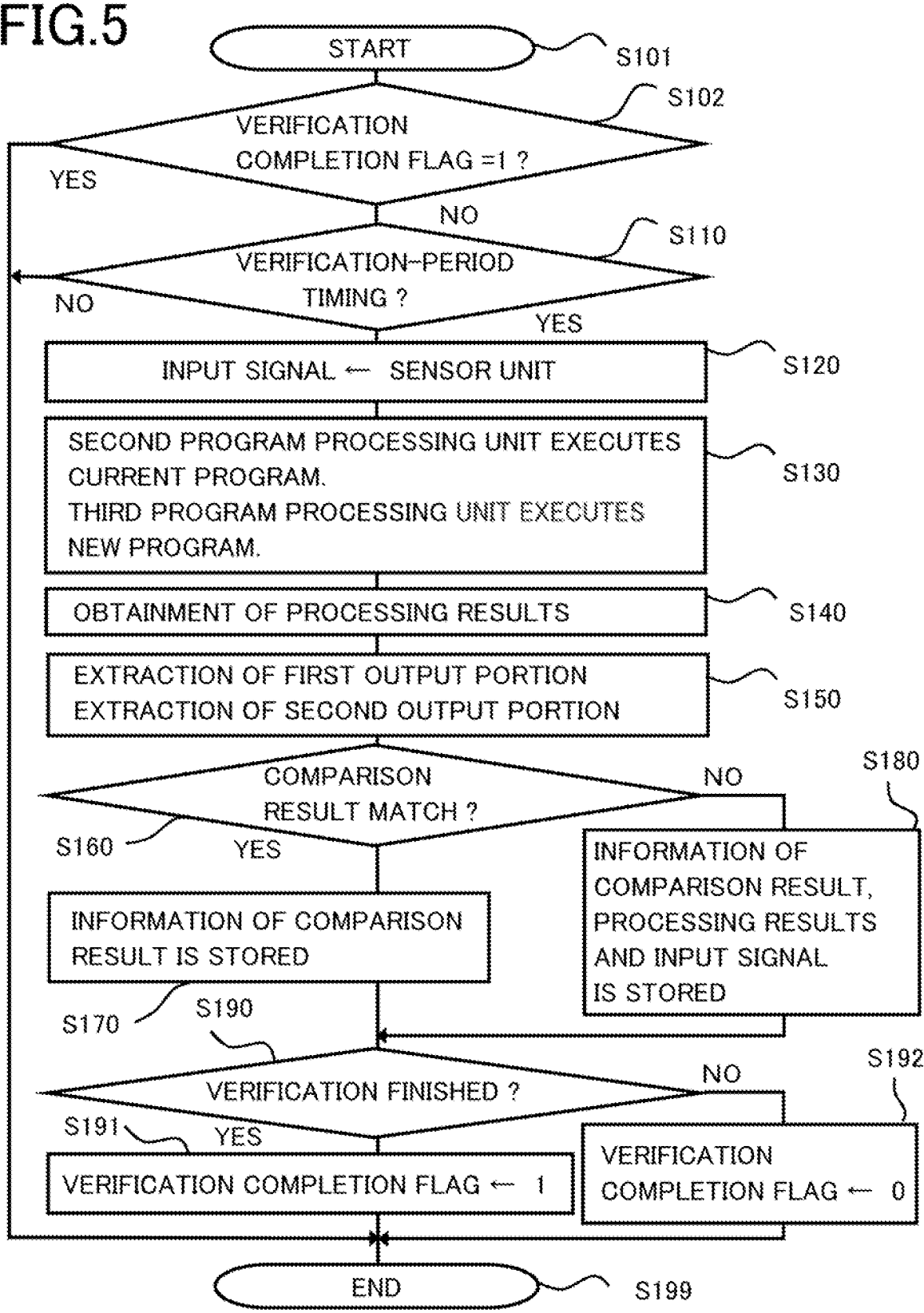
FIG. 5 is a flowchart for explaining processing in the verification apparatus according to Embodiment 1.

FIG. 1 is a block diagram representing the configuration of a verification apparatus 3 according to Embodiment 1. FIG. 2 is a diagram representing the hardware configuration of a vehicle-mounted apparatus 1 according to Embodiment 1. FIG. 3 is a flowchart for explaining verification-period setting in the verification apparatus 3 according to Embodiment 1. FIG. 4 is a set of drawings for explaining an input signal of the verification apparatus 3 according to Embodiment 1. FIG. 5 is a flowchart for explaining processing in the verification apparatus 3 according to Embodiment 1.

<Vehicle-Mounted Apparatus>

As represented in FIG. 1, the vehicle-mounted apparatus 1 according to Embodiment 1 includes a vehicle-mounted control apparatus 2 and the verification apparatus 3. In FIG. 1, the illustration of constituent elements that are not directly related to Embodiment 1 are omitted. The vehicle-mounted apparatus 1 is a control apparatus for controlling respective vehicle apparatuses for electric-power conversion, engine control, transmission control, steering control, brake control, audio control, video control, collision prevention control, inter-vehicle distance control, headlight control, door control, power window control, radio key-lock control, automatic driving control, failure diagnosis control, and the like; the vehicle-mounted apparatus 1 is provided with a verification apparatus.

Respective functions of the vehicle-mounted apparatus 1 are realized by processing circuits provided in the vehicle-mounted apparatus 1. Specifically, as illustrated in FIG. 2, the vehicle-mounted apparatus 1 includes, as the processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

It may be allowed that as the computing processing unit 90, an ASIC (Application Specific Integrated Circuit), an IC (Integrated Circuit), a DSP (Digital Signal Processor), an FPGA (Field Programmable Gate Array), each of various kinds of logic circuits, each of various kinds of signal processing circuits, or the like is provided. In addition, it may be allowed that as the computing processing unit 90, two or more computing processing units of the same type or different types are provided and respective processing items are executed in a sharing manner. As the storage apparatuses 91, there are provided nonvolatile or volatile semiconductor memories such as a RAM (Random Access Memory) that can read data from and write data in the computing processing unit 90, a ROM (Read Only Memory) that can read data from the computing processing unit 90, a flash memory, an EPROM, an EEPROM. The input circuit 92 is connected with various kinds of sensors and switches and is provided with an A/D converter and the like for inputting output signals from the sensors and the switches to the computing processing unit 90. The output circuit 93 is connected with electric loads and is provided with a driving circuit and the like for converting and outputting a control signal from the computing processing unit 90 to the electric loads.

The computing processing unit 90 runs software items (programs) stored in the storage apparatus 91 such as a ROM and collaborates with other hardware devices in the vehicle-mounted apparatus 1, such as the storage apparatus 91, the input circuit 92, and the output circuit 93, so that the respective functions provided in the vehicle-mounted apparatus 1 are realized. Setting data items such as a threshold value and a determination value to be utilized in the vehicle-mounted apparatus 1 are stored, as part of software items (programs), in the storage apparatus 91 such as a ROM.

The respective functions of the constituent elements in the vehicle-mounted apparatus 1 in FIG. 1 will be explained. It may be allowed that the vehicle-mounted control apparatus 2, the verification apparatus 3, and the respective functions indicated by reference numerals 11 through 20, described inside the vehicle-mounted apparatus 1 in FIG. 1, are configured with either software modules or combinations of software and hardware.

<Vehicle-Mounted Control Apparatus>

The vehicle-mounted control apparatus 2 has a sensor unit 11, a first program processing unit 12, an actuator unit 13, and a program recording unit 14. In Embodiment 1, the vehicle-mounted control apparatus 2 will be explained as an electric-power conversion apparatus. The sensor unit 11 detects an input signal such as an AC voltage or an AC current. The first program processing unit 12 reads out an electric-power conversion processing program recorded in the program recording unit 14. By use of the input signal detected by the sensor unit 11, the first program processing unit 12 performs program processing and then outputs the result of the program processing to the actuator unit 13, so that an electric-power conversion apparatus is controlled.

<Verification Apparatus>

The verification apparatus 3 is an apparatus that execute the current program and a new program in a parallel manner and compares the respective outputs so as to perform a regression test of the new program. The verification apparatus 3 has a new program recording unit 15, a second program processing unit 16, a third program processing unit 17, a comparison determination unit 18, a verification-period setting unit 19, and a verification recording unit 20. A copy of the current program read out from the program recording unit 14 is disposed in the second program processing unit 16. The new program read out from the new program recording unit 15 is disposed in the third program processing unit 17. Each of the second program processing unit 16 and the third program processing unit 17 obtains the input signal, detected by the sensor unit 11, in a period set by the verification-period setting unit 19 and then performs the processing. The comparison determination unit 18 compares the respective processing results of the second program processing unit 16 and the third program processing unit 17 and verifies whether or not the processing results in the portions other than a modification portion where the specification of the new program, obtained by changing the specification of the current program, affects the output are the same. The new program is a program obtained by changing part of the current program.

That is to say, the verification apparatus 3 according to Embodiment 1 verifies the vehicle-mounted control apparatus 2 having the sensor unit 11, the program recording unit 14 in which the current program for the vehicle-mounted control apparatus 2 has been recorded, and the first program processing unit 12 that receives a signal to be outputted from the sensor unit 11, executes the current program read out from the program recording unit 14, based on the signal, and then outputs the processing result to the actuator unit 13; the verification apparatus 3 includes the second program processing unit 16 that receives the signal to be outputted from the sensor unit 11, executes a program the same as the current program, based on the signal, and then outputs the processing result, the third program processing unit 17 that receives the signal to be outputted from the sensor unit 11, executes a new program obtained by adding a specification change to the current program, based on the signal, and then outputs the processing result, and the comparison determination unit 18 that compares a first output portion obtained by removing the portion, in the output of the third program processing unit 17, that is affected by the specification change with a second output portion, in the output of the second program processing unit 16, that corresponds to the first output portion, and then determines identity therebetween.

As described above, because the verification apparatus 3 makes the current software and the new software obtained by changing part of the current software executed in a parallel manner, without affecting the operation of the vehicle-mounted control apparatus 2 in which the current software has been mounted, and compares the respective outputs thereof, an effective regression test can be performed at low cost. Because the verification apparatus 3 is mounted practically in a vehicle and receives a signal from the sensor unit 11, it is not required to preliminarily prepare diverse input information items; thus, verification based on an actual state can be performed.

Moreover, for example, even in the case where the execution period of the vehicle-mounted control apparatus 2 needs to be shortened, the demand can be satisfied only by shortening the processing period of the first program processing unit 12 in the vehicle-mounted control apparatus 2. This is because even when none of the respective processing periods of the second program processing unit 16 and the third program processing unit 17 is shortened, there can be achieved the output-comparison function, of the verification apparatus, that is based on the execution of the current program and the new program. Thus, because the verification apparatus 3 can directly respond to the shortening of the control period of the vehicle-mounted control apparatus 2, an effective regression test can be performed at low cost.

Still moreover, when the verification apparatus 3 is made to read out the current program from the program recording unit 14, the consistency of the subject to be compared with the new program can be secured and hence the version of a program can be prevented from being mistakenly recognized. Furthermore, sharing of the storage area of a program makes it possible to efficiently utilize resources such as memories. In addition, provision of the new program recording unit 15 that reads out a new program to be compared with the current program by the verification apparatus 3 facilitates replacement of the new program to be compared and hence contributes to enhancement of the software-development efficiency.

<Verification-Period Setting Unit>

The verification-period setting unit 19 in FIG. 1 will be explained. The verification-period setting unit 19 has a function of setting a period in which the verification apparatus 3 executes new software and the current software in a parallel manner and compares the respective outputs. As a second period, which is a verification period, the verification-period setting unit 19 can set a value the same as or larger than a first period, which is the control period of the vehicle-mounted control apparatus 2. In the present embodiment, there will be described advantages in the case where in consideration of a software-execution load, the second period is set to a value larger than the first period; however, it goes without saying that in the case where there exists a sufficient margin for the software-execution load on the vehicle-mounted apparatus 1, no problem is posed even when the second period is set to a value the same as the first period. When the second period is set to a value the same as the first period, the verification of the new program can be performed with the control timing of an actual vehicle; thus, this method is significant and makes it possible to maintain a high verification efficiency. It may be also allowed that in the case where the software-execution load is the same as or smaller than a predetermined value (e.g., 50%), the second period is made to be the same as the first period so as to maintain a high verification efficiency and that in the case where the software-execution load is larger than a predetermined value (e.g., 50%), the second period is made to be larger than (e.g., twice as large as) the first period so as to prevent the software-execution load from becoming excessive. In addition, it may be allowed that the second period is made to continuously and largely change in response to an increase in the software-execution load so that the software-execution load is prevented from becoming excessive. Advantages in the case where the second period is set to a value larger than the first period will be described below.

In the case where the second period, which is the verification period of the verification apparatus 3, is set to a value the same as or larger than the first period, which is the control period of the vehicle-mounted control apparatus 2, the frequency of verification by the verification apparatus 3 becomes smaller than the frequency of control of the actuator unit 13 performed by the vehicle-mounted control apparatus 2. In this situation, in the case where the verification frequency decreases, the controllability of the vehicle-mounted control apparatus 2 is not affected and the software-execution load, on the computing processing unit 90, that is related to the verification apparatus 3 decreases, and hence the software-execution load, on the computing processing unit 90, that is related to the whole vehicle-mounted apparatus 1 is reduced.

As a result, for example, in the case where by means of a piece of the computing processing unit 90, the vehicle-mounted apparatus 1 performs processing of software items of the first program processing unit 12, the second program processing unit 16, and the third program processing unit 17, the software-execution load on the computing processing unit 90 decreases; thus, because the vehicle-mounted apparatus 1 can perform processing in a shorter effective period or can perform processing of an additional function, this method is largely significant.

In the case where when the vehicle-mounted apparatus 1 has a plurality of the computing processing units 90 and the respective computing processing units 90 are arranged in the vehicle-mounted control apparatus 2 and the verification apparatus 3, the second period is set to be larger than the first period, the software-execution load on the computing processing unit 90 of the verification apparatus 3 decreases; thus, the cost can be reduced by replacing the computing processing unit 90 of the verification apparatus 3 by the computing processing unit 90 having a lower calculation speed. Alternatively, it is also made possible to make the computing processing unit 90 of the verification apparatus 3 perform processing for another function; thus, this method is largely significant.

Moreover, in the case where an input signal to be detected by the sensor unit 11 has a periodical property, the verification-period setting unit 19 can calculate the period of the input signal and can set the second period, which is the verification period of the verification apparatus 3, based on the period of the input signal.

When the input signal does not change, the result of comparison between the respective outputs obtained through the execution of the current program and the new program by the verification apparatus 3 does not change, either. Accordingly, in the case where the input signal gently changes, setting the second period, which is the verification period of the verification apparatus 3, to a large value does not pose any problem, because no difference occurs in the verification result.

In contrast, in the case where the input signal changes in a short time, setting the second period, which is the verification period of the verification apparatus 3, to a small value can increase the verification frequency, and hence the verification efficiency can be raised. Therefore, setting the second period based on the period of the input signal is largely significant.

Moreover, in the case where an input signal to be detected by the sensor unit 11 has a periodical property, the verification-period setting unit 19 can set the second period, which is the verification period, to a value that is shorter than the period of the input signal and is different from the period obtained by dividing the period of the input signal by an integer.

Setting the second period, which is the verification period, in such a manner as described above can prevent the verification period from becoming integer-fold as large as the period of the input signal. The reason why the second period is set in the foregoing manner is that in the case where when the input signal has a periodical property, the input signal is utilized in a period integer-fold as large as the period of the input signal, only parts of the input signal, which have the same value, are sampled and hence the input value for the verification is limited, resulting in a deterioration of the verification efficiency. Thus, because by setting the second period, which is the verification period, to a value that is shorter than the period of the input signal and is different from the period obtained by dividing the period of the input signal by an integer, the number of kinds of the input values to be utilized in the verification is increased, the verification efficiency is raised; thus, this method is largely significant.

Moreover, the verification-period setting unit 19 can set the second period, which is the verification period of the verification apparatus 3, to a value that is different from a value integer-fold as large as the first period, which is the control period of the vehicle-mounted control apparatus 2.

In the case where the verification period is integer-fold as long as the control period, the verification by the verification apparatus 3 is performed every predetermined number of the program processing instances of the vehicle-mounted control apparatus 2. As a result, in the case where there exists a signal to be inputted from the sensor unit 11 every predetermined times and this input causes a difference between the respective outputs obtained through execution of the current program and the new program, there may occur the case where depending on the timing, the input signal that causes the output difference is not detected in the verification apparatus 3.

Accordingly, the second period, which is the verification period of the verification apparatus 3, is set to a value that is different from a value integer-fold as large as the first period, which is the control period of the vehicle-mounted control apparatus 2, so that the respective timings of the program processing by the vehicle-mounted control apparatus 2 and the verification processing by the verification apparatus 3 are gradually shifted from each other so as to increase the number of kinds of input values for the verification processing; this method is largely significant because it can contribute to enhancement of the verification efficiency.

The comparison determination unit 18 and the verification recording unit 20 represented in FIG. 1 will be explained.

<Comparison Determination Unit>

The verification apparatus 3 receives a signal outputted by the sensor unit 11; based on the signal, the second program processing unit 16 executes the current program and outputs the processing result, and the third program processing unit 17 executes the new program and outputs the processing result; then, the verification apparatus 3 compares the two processing results. However, in some cases, the new program has an area where due to the effect of a specification change, a value different from that of the current program is outputted.

In the case where there exists an area where due to the effect of a specification change, a value different from that of the current program is outputted, the comparison determination unit 18 outputs the first output portion obtained by removing the output corresponding to the area from the output obtained through the new program. Then, the comparison determination unit 18 outputs, as the second output portion, the output portion corresponding to the first output portion out of the output of the processing result obtained through the execution of the current program by the second program processing unit 16.

The comparison determination unit 18 compares the second output portion, which is part of the output of the second program processing unit 16, with the first output portion, which is part of the output of the third program processing unit 17, so as to determine the identity.

In the case where the new program has a bug, outputting is made in a different manner at a time when in a normal situation, behavior the same as that based on the current program should be taken. Moreover, in addition to the case where due to a bug in the new program, an unexpected behavior is taken, there may be a case where the contents of a specification change is different from a programmer's interpretation of the specification change. In that case, the effect of the specification change may be provided to an area different from the area that has originally be considered.

In this case, the identity between the first output portion and the second output portion is lost; thus, comparison determination unit 18 determines that the first output portion and the second output portion do not coincide with each other. The result of the comparison by the comparison determination unit 18 is recorded in the verification recording unit 20. In the case where the determination result is "discrepancy", the respective output results of the current program and the new program and the value of an input signal utilized in the processing are recorded in the verification recording unit 20.

<Verification Recording Unit>

The problem in the new program can be unraveled by analyzing the respective records of the input signal and the output signal at a time when the determination results differ; thus, it is very significant to record the input signal and the output signal. It may be allowed that the respective records at a time of coincidence and at a time of discrepancy and the records of the input signal and respective output signals at a time of discrepancy, which are recorded in the verification recording unit 20, are taken out through a communication line in the vehicle or through wireless communication. The taken-out verification information can instantaneously be utilized in improving the new program and hence is effective for raising the software-development efficiency.

In addition, there can be utilized a configuration in which two or more control programs are set in the storage apparatus 91 and in which through an external instruction, arbitrary programs are sent to the program recording unit 14 and the new program recording unit 15 and are stored therein. The respective programs to be executed by the first program processing unit 12 and the second program processing unit 16 are read out from the program recording unit 14. The new program to be executed by the third program processing unit 17 is read out from the new program recording unit 15. Accordingly, it is very significant that a program to be subjected to execution or to a regression test can instantaneously be replaced. Moreover, there can be utilized a configuration in which through a communication line, the vehicle-mounted apparatus receives a program and then stores it in the storage apparatus 91. This method makes it possible to instantaneously replace the program to be verified, through an external instruction, and hence is effective for raising the software-development efficiency.

<Flow of Verification-Period Setting>

Next, there will be explained a flow of verification-period setting performed by the verification-period setting unit 19 in the verification apparatus 3 according to Embodiment 1. FIG. 3 is a flowchart for explaining the flow of verification-period setting in the verification apparatus 3 according to Embodiment 1.

The processing in FIG. 3 is executed, for example, every 50 μs. The processing started at the step S1 determines in the step S10 whether or not an input signal detected by the sensor unit 11 is periodic. Whether or not the input signal is periodic is determined based on the history of the levels of the past input signals that have been sequentially stored in the storage apparatus 91. In the case where the input signal is periodic, the step S10 is followed by the step S20; in the case where the input signal is not periodic, the step S10 is followed by the step S30.

In the step S20, the second period is set to a period of a value that is smaller than the period of the input signal and is different from the period obtained by dividing the period of the input signal by an integer. Furthermore, the second period, which is the verification period of the verification apparatus 3, is set to a value larger than a first control period of the vehicle-mounted control apparatus 2. After the step S20, the processing is ended in the step S90.

In the step S30, the verification period is set to a predetermined specified value. The specified value is larger than the control period of the vehicle-mounted control apparatus 2. After the step S30, the processing is ended in the step S90.

There will be explained the period of a value that is smaller than the period of the input signal detected by the sensor unit 11 and is different from the period obtained by dividing the period of the input signal by an integer and that is larger than the control period of the vehicle-mounted control apparatus 2. For example, when the input signal from the outside is a sinusoidal wave of 50 Hz, the period of the input signal is 20 ms. The control period of the vehicle-mounted control apparatus for measuring a change in the input signal and performing electric-power conversion control is set to 50 μs. In this situation, FIG. 4 represents the case where the verification period is set to, for example, 3 ms, as a value that is smaller than the period of the input signal, that is not the period obtained by dividing the period of the input signal by an integer, and that is larger than the control period of the vehicle-mounted control apparatus 2.

Setting the second period, which is the verification period of the verification apparatus 3, to a value larger than the first period, which is the control period of the vehicle-mounted control apparatus 2, makes it possible to reduce the software-execution load on the verification apparatus; thus, the effect provided to the processing by the vehicle-mounted control apparatus 2 can be suppressed. Furthermore, when as represented in FIG. 4, the second period, which is the verification period, is set to a value that is smaller than the period of the input signal and is not the period obtained by dividing the period of the input signal by an integer, the input signal to be utilized in the verification can uniformly be taken out.

FIG. 4 will be explained in detail. FIG. 4 represents a specific example for obtaining the second period, which is the verification period, and the input signal. FIG. 4 represents the waveform of the input signal and the input-signal values obtained in the verification period. There is represented an example in which the input signal is a voltage whose maximum value is 100 V and whose frequency is 50 Hz.

In FIG. 4, the verification period is 3 ms; the input signal is obtained at each of the verification-period timings, i.e., 3 ms, 6 ms, 9 ms, 12 ms, 15 ms, 18 ms, 21 ms, 24 ms, 27 ms, 30 ms, 33 ms, 36 ms, and 39 ms. In this situation, the respective voltage values of the input signal are 80.9V, 95.1V, 30.9V, −58.8V, −100.0V, −58.8V, 30.9V, 95.1V, 80.9V, 0.0V, −80.9V, −95.1V, and −30.9V. As described above, the second period, which is the verification period, is set to a value that is smaller than the period of the input signal, that is a period different from the period obtained by dividing the period of the input signal by an integer, and that is larger than the first period, which is the control period of the vehicle-mounted control apparatus 2. Accordingly, it can be avoided that the respective timings for obtaining the input signal synchronize with one another every 20 ms, which is the period of the input signal. Accordingly, the verification can be performed without ununiformity in which the same value of the input signal to be utilized in the verification repeats every 20 ms. Thus, this setting method can contribute to enhancement of the verification efficiency.

In addition, although in Embodiment 1, the description has been made with a verification period of 3 ms, the verification period is not limited to 3 ms; any value can be adopted, as long as it is a value that is smaller than the period of the input signal, that is a period different from the period obtained by dividing the period of the input signal by an integer, and that is larger than the control period of the vehicle-mounted control apparatus 2

<Flow of Verification Operation>

The flow of verification operation by the verification apparatus 3 will be explained. FIG. 5 is a flowchart for explaining the flow of verification operation in the verification apparatus 3 according to Embodiment 1.

The processing in the flowchart in FIG. 5 is executed, for example, every 50 μs. The processing is started in the step S101; then, in the step S102, it is checked whether or not a verification completion flag has been set. Because when the verification completion flag has been set, the verification is not required, the step S102 is followed by the step S199, where the processing is ended.

In the case where in the step S102, the verification completion flag had not been set, the step S102 is followed by the step S110. In the step S110, it is determined whether or not a set verification-period time has elapsed and the present timing is a verification-period timing (e.g., 3 ms has elapsed from the previous execution). The verification period is set by the verification-period setting unit 19. In the case where in the step S110, the present timing is not a verification-period timing, the processing is ended in the step S199.

In the case where in the step S110, the present timing is a verification-period timing, the step S110 is followed by the step S120. In the step S120, the verification apparatus 3 obtains an input signal detected by the sensor unit 11.

In the step S130 following the step S120, the second program processing unit 16 executes the current program read out from the program recording unit 14, based on the input signal detected by the sensor unit 11. Then, the third program processing unit 17 executes a new program read out from the new program recording unit 15, based on the input signal detected by the sensor unit 11; after that, the step S130 is followed by the step S140.

In the step S140, the comparison determination unit 18 obtains the respective processing results of the current program and the new program. In the step S150 following the step S140, based on information on a specification change in the preliminarily stored new program, the comparison determination unit 18 extracts the first output portion obtained by removing the output to be affected by the specification change from the output obtained through the new program. Then, the comparison determination unit 18 extracts the second output portion corresponding to the first output portion form the output obtained through the current program. Next, the step S150 is followed by the step S160.

In the step S160, the comparison determination unit 18 compares the second output portion with the first output portion so as to determine the identity. In the case where it is determined that the second output portion is identical to the first output portion, the step S160 is followed by the step S170; in the case where it is determined that the second output portion is not identical to the first output portion, the step S160 is followed by the step S180.

Because the second output portion is identical to the first output portion, only the information that "the respective processing results are identical to each other" is stored in the verification recording unit 20 in the step S170; then, the step S170 is followed by the step S190.

In the step S180, because the second output portion is not identical to the first output portion, information that "the respective processing results are not identical to each other", a recording number (recording serial number) at a time of discrepancy, the respective processing results of the current program and the new program, and information on the input signal utilized in the processing are stored in the verification recording unit 20; then, the step S180 is followed by the step S190.

In the step S190, the comparison determination unit 18 determines whether or not the verification should be ended. In the case where the comparison determination unit 18 determines that the verification should be continued, the step S190 is followed by the step S192, where the verification completion flag is cleared; then, the processing is ended in the step S199. While the verification completion flag is cleared, the verification operation is continued in the set verification period.

In the case where the comparison determination unit 18 determines in the step S190 that the verification should be ended, the step S190 is followed by the step S191, where the verification completion flag is set; then, the processing is ended in the step S199. Accordingly, no verification operation is performed from the next time on. In addition, in order to determine whether or not the verification should be ended, the elapse of a set time, the timing at which the set number of verification instances is exceeded, an external instruction signal, or the like can be utilized.

In accordance with the foregoing procedure, the verification can be performed in the second period determined by the verification-period setting unit 19. It is made possible that while the vehicle-mounted control apparatus 2 performs normal processing, the verification apparatus 3 performs a regression test of the output portion that is not affected by a specification change in the new program and then the result is accumulated.

Because the verification apparatus 3 according to Embodiment 1 is mounted in the vehicle-mounted apparatus 1 along with the vehicle-mounted control apparatus 2 and because by use of input information to be obtained through actual vehicle control, the respective processing results obtained through the parallel processing of the current program and the new program are compared, the verification can be performed without requiring preparation of an input-data pattern. Moreover, setting the verification period of the verification apparatus 3 to a value larger than the control period of the vehicle-mounted control apparatus 2 reduces the software-execution load on the verification apparatus 3, and hence it can be avoided that the computing processing unit 90 of the vehicle-mounted apparatus 1 lacks processing performance; therefore, the regression test can readily be performed without affecting the operation, in accordance with the current program, of the vehicle-mounted control apparatus.

2. Embodiment 2

In Embodiment 1, it has been explained that the period of the verification execution by the verification apparatus 3 is extended so as to reduce the software-execution load on the verification apparatus 3, so that the processing performance of the computing processing unit 90 in the vehicle-mounted apparatus 1 is prevented from lacking. In Embodiment 2, by use of flowcharts, there will be explained a method in which the execution period of the overall verification processing by the verification apparatus 3 is extended and the verification processing is executed in a divided manner, so that the period of occupancy of the computing processing unit 90 for execution of each of the respective portions is shortened so as to reduce the software-execution load.

Figure 6:
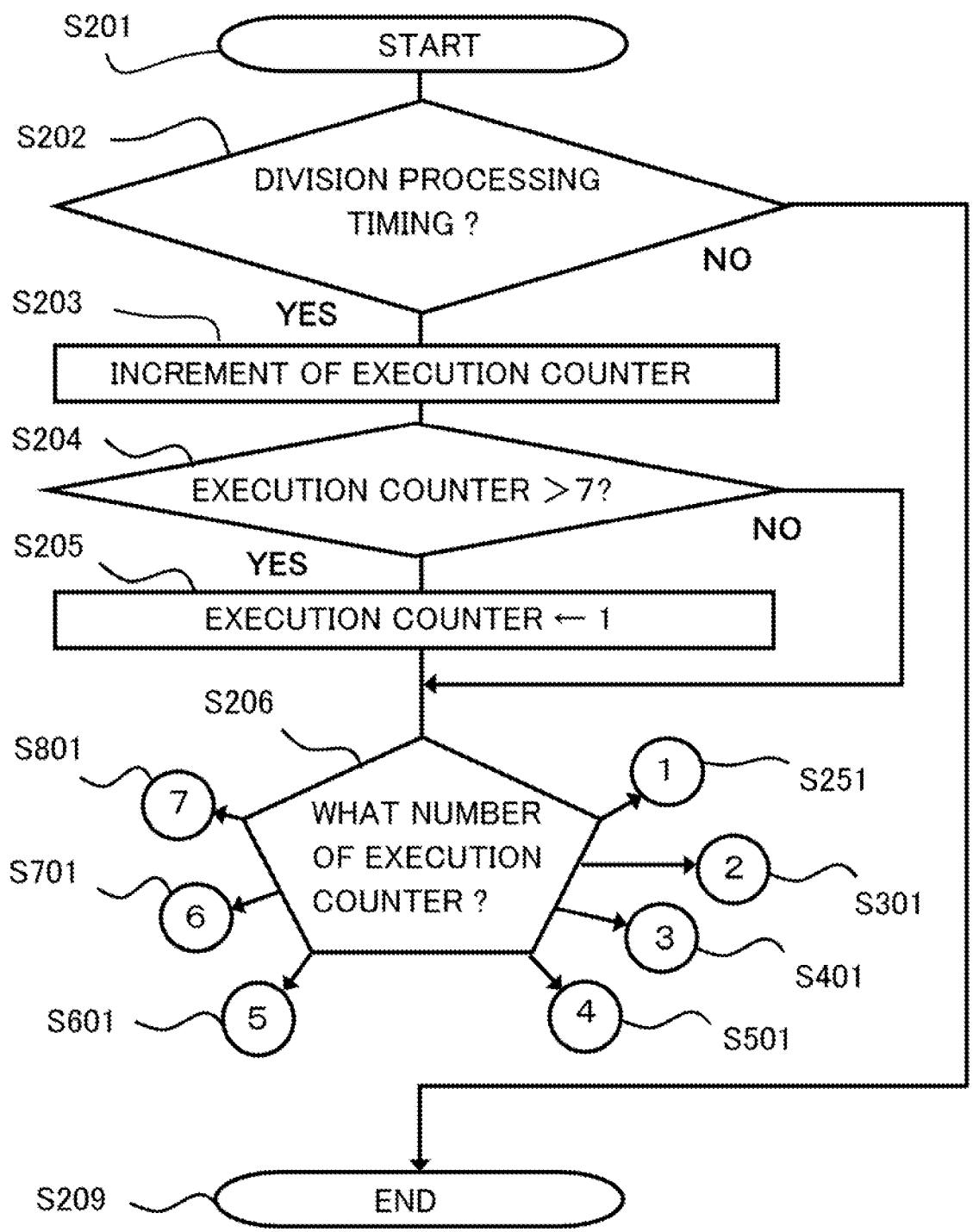
FIG. 6 is a first flowchart for explaining processing in a verification apparatus according to Embodiment 2.
Figure 7:
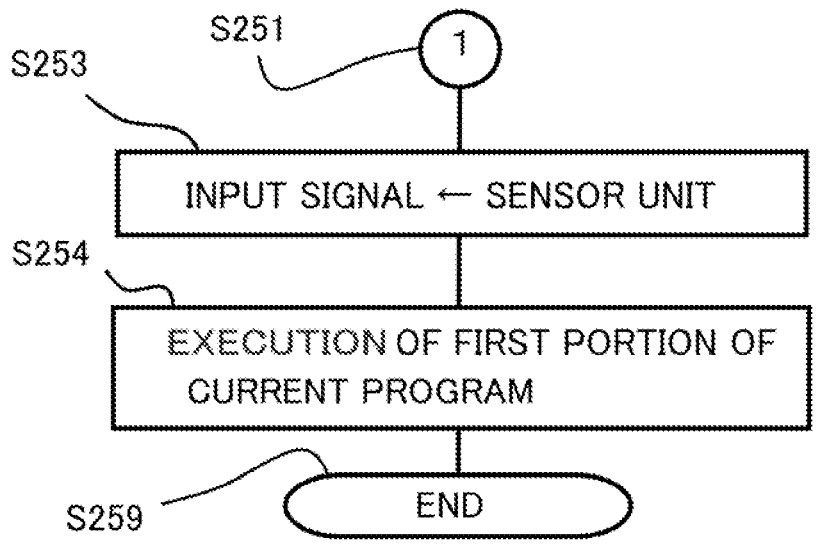
FIG. 7 is a second flowchart for explaining the processing in the verification apparatus according to Embodiment 2.
Figure 8:
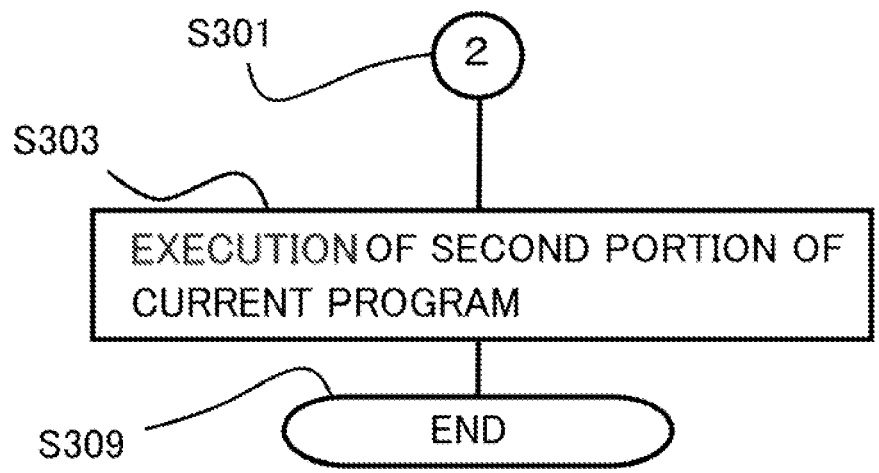
FIG. 8 is a third flowchart for explaining the processing in the verification apparatus according to Embodiment 2.
Figure 9:
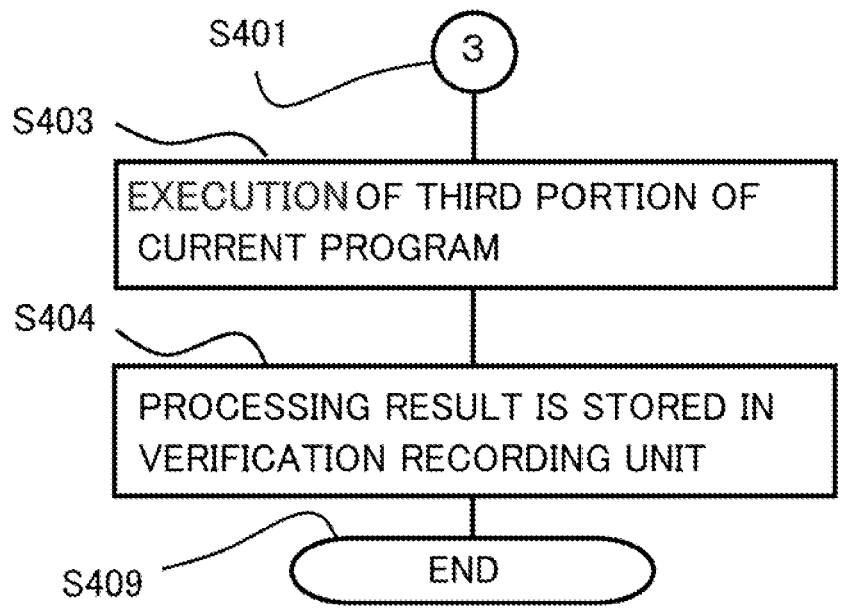
FIG. 9 is a fourth flowchart for explaining the processing in the verification apparatus according to Embodiment 2.
Figure 10:
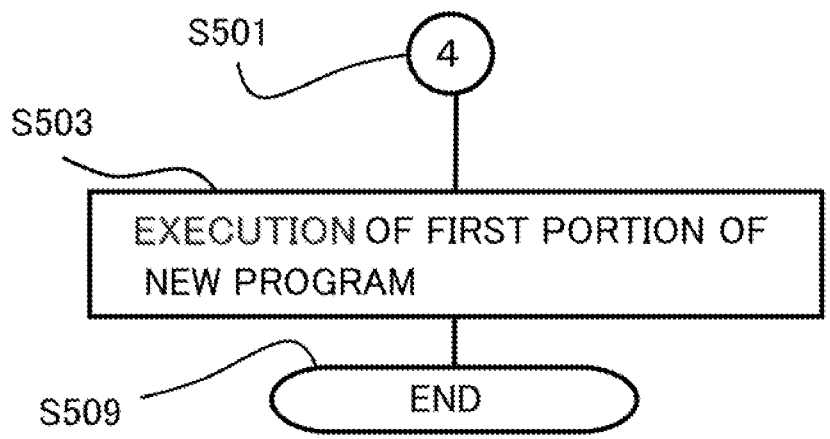
FIG. 10 is a fifth flowchart for explaining the processing in the verification apparatus according to Embodiment 2.
Figure 11:
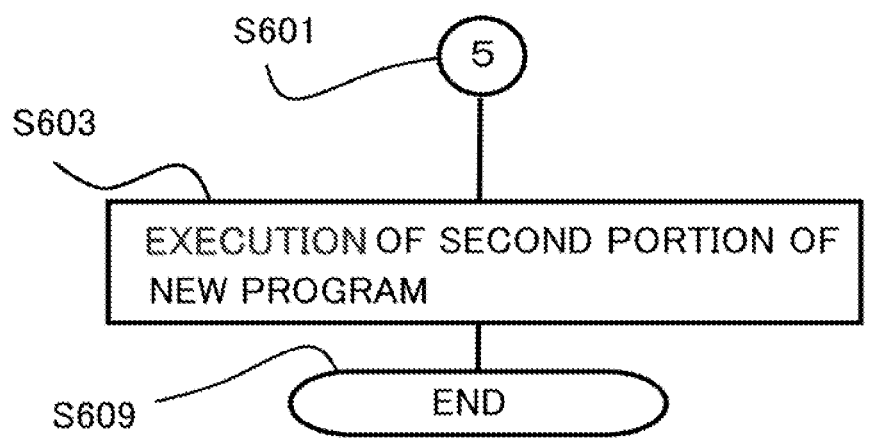
FIG. 11 is a sixth flowchart for explaining the processing in the verification apparatus according to Embodiment 2.
Figure 12:
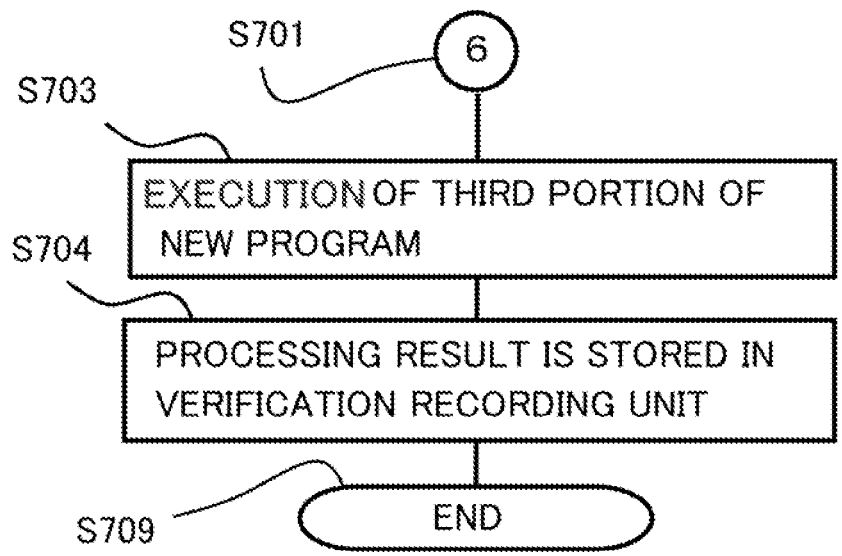
FIG. 12 is a seventh flowchart for explaining the processing in the verification apparatus according to Embodiment 2.

FIG. 6 is a first flowchart for explaining processing in the verification apparatus 3 according to Embodiment 2. FIG. 7 is a second flowchart for explaining processing in the verification apparatus 3 according to Embodiment 2. FIG. 8 is a third flowchart for explaining processing in the verification apparatus 3 according to Embodiment 2. FIG. 9 is a fourth flowchart for explaining processing in the verification apparatus 3 according to Embodiment 2. FIG. 10 is a fifth flowchart for explaining processing in the verification apparatus 3 according to Embodiment 2. FIG. 11 is a sixth flowchart for explaining processing in the verification apparatus 3 according to Embodiment 2. FIG. 12 is a seventh flowchart for explaining processing in the verification apparatus 3 according to Embodiment 2. FIG. 13 is an eighth flowchart for explaining processing in the verification apparatus 3 according to Embodiment 2.

In in Embodiment 2, there is described a case where the current program is divided into three portions and the respective divided portions can sequentially be executed. Similarly, there is described a case where a new program is also divided into three portions and the respective divided portions can sequentially be executed. Such a configuration in which divisional execution can be performed makes it possible that the time of occupancy of the computing processing unit 90 is shortened and the divided portions are sequentially executed so that the software-execution load on the computing processing unit 90 is reduced. In particular, when the vehicle-mounted control apparatus 2 and the verification apparatus 3 are controlled by one piece of the computing processing unit 90 and when the control period, for the vehicle apparatus, of the vehicle-mounted control apparatus 2 is short, shortening the period of occupancy of the computing processing unit 90 by the verification apparatus 3 prevents the control of the verification apparatus 3 from hindering the control of the vehicle-mounted control apparatus 2 and is advantageous in terms of securing the controllability of the vehicle-mounted control apparatus 2.

In Embodiment 2, there will be explained a case where a regression test for comparing the respective outputs obtained through the current program and a new program is performed after each of the programs is divided into seven portions. The number of portions to be divided is not limited to seven.

FIG. 6 represents processing for determining which portion of the divided programs for the verification processing is executed. The processing to be stared in the step S201 is executed, for example, every 50 μs. In the step S202, it is determined whether or not the present timing is a division processing timing. In the step S202, it is determined whether or not the time of a set division processing period (e.g., 0.4 ms) has elapsed and the present timing is the division processing timing for executing the divided program. The division processing period is set by the verification-period setting unit 19. The period in which the whole processing of the divided verification programs is executed is the second period. In this case, because each of seven portions is executed every 0.4 ms, the second period becomes 2.8 ms in total.

In the case where in the step S202, the present timing is not the division processing timing, the processing is ended in the step S209. In the case where in the step S202, the present timing is the division processing timing, an execution counter is incremented (by 1) in the step S203. The execution counter counts the number for determining which portion of the program to be executed in a divided manner; in the case of FIG. 6, the execution counter can take values from 1 to 7.

In the step S204 following the step S203, it is checked whether or not the value of the execution counter is larger than 7. When in the step S203, the counter is incremented to 8, the value of the execution counter becomes larger than 7. In the case where the value of the execution counter is larger than 7, the value of the execution counter is set to 1 in the step S205; then, the step S205 is followed by the step S206. In the case where in the step S204, the value of the execution counter is the same as or smaller than 7, the step S204 is directly followed by the step S206.

In the step S206, the step to be taken is specified by the number of the execution counter. In the case where the value of the execution counter is 1, the step S206 is followed by the step S251 indicated by (1). In the case where the value of the execution counter is 2, the step S206 is followed by the step S301 indicated by (2). In the case where the value of the execution counter is 3, the step S206 is followed by the step S401 indicated by (3). In the case where the value of the execution counter is 4, the step S206 is followed by the step S501 indicated by (4). In the case where the value of the execution counter is 5, the step S206 is followed by the step S601 indicated by (5). In the case where the value of the execution counter is 6, the step S206 is followed by the step S701 indicated by (6). In the case where the value of the execution counter is 7, the step S206 is followed by the step S801 indicated by (7).

FIG. 7 represents the flowchart at a time when the value of the execution counter is 1. In the case where in the step S206 in FIG. 6, the value of the execution counter is 1, the step S206 is followed by the step S251. In the step S253 following the step S251, an input signal detected by the sensor unit 11 is obtained.

In the step S254 following the step S253, the second program processing unit 16 executes the first portion out of the three portions obtained by dividing the current program read out from the program recording unit 14, based on the input signal detected by the sensor unit 11. After that, the processing is ended in the step S259.

FIG. 8 represents the flowchart at a time when the value of the execution counter is 2. In the case where in the step S206 in FIG. 6, the value of the execution counter is 2, the step S206 is followed by the step S301. In the step S303 following the step S301, the second program processing unit 16 executes the second portion out of the three portions obtained by dividing the current program. After that, the processing is ended in the step S309.

FIG. 9 represents the flowchart at a time when the value of the execution counter is 3. In the case where in the step S206 in FIG. 6, the value of the execution counter is 3, the step S206 is followed by the step S401. In the step S403 following the step S401, the second program processing unit 16 executes the third portion out of the three portions obtained by dividing the current program. After that, in the step S404, the processing result is stored in the verification recording unit 20. Then, the processing is ended in the step S409.

FIG. 10 represents the flowchart at a time when the value of the execution counter is 4. In the case where in the step S206 in FIG. 6, the value of the execution counter is 4, the step S206 is followed by the step S501. In the step S503 following the step S501, the third program processing unit 17 executes the first portion out of the three portions obtained by dividing the new program read out from the new program recording unit 15, based on the input signal detected by the sensor unit 11. After that, the processing is ended in the step S509.

FIG. 11 represents the flowchart at a time when the value of the execution counter is 5. In the case where in the step S206 in FIG. 6, the value of the execution counter is 5, the step S206 is followed by the step S601. In the step S603 following the step S601, the third program processing unit 17 executes the second portion out of the three portions obtained by dividing the new program. After that, the processing is ended in the step S609.

FIG. 12 represents the flowchart at a time when the value of the execution counter is 6. In the case where in the step S206 in FIG. 6, the value of the execution counter is 6, the step S206 is followed by the step S701. In the step S703 following the step S701, the third program processing unit 17 executes the third portion out of the three portions obtained by dividing the new program. After that, in the step S704, the processing result is stored in the verification recording unit 20. After that, the processing is ended in the step S709.

FIG. 13 represents the flowchart at a time when the value of the execution counter is 7. In the case where in the step S206 in FIG. 6, the value of the execution counter is 7, the step S206 is followed by the step S801. In the step S802 following the step S801, the comparison determination unit 18 obtains the respective processing results of the current program and the new program from the verification recording unit 20.

In the step S803 following the step S802, based on information on a specification change in the preliminarily stored new program, the comparison determination unit 18 extracts the first output portion obtained by removing the output to be affected by the specification change from the output obtained through the new program. Then, the comparison determination unit 18 extracts the second output portion corresponding to the first output portion form the output obtained through the current program. Next, the step S803 is followed by the step S804.

In the step S804, the comparison determination unit 18 compares the second output portion with the first output portion so as to determine the identity. In the case where it is determined that the second output portion is identical to the first output portion, the step S804 is followed by the step S807; in the case where it is determined that the second output portion is not identical to the first output portion, the step S804 is followed by the step S805.

Because the second output portion is identical to the first output portion, only the information that "the respective processing results are identical to each other" is stored in the verification recording unit 20 in the step S807; then, the processing is ended in the step S809.

In the step S805, because the second output portion is not identical to the first output portion, information that "the respective processing results are not identical to each other" is stored in the verification recording unit 20. Then, in the step S806, a recording number (recording serial number) at a time of discrepancy, the respective processing results of the current program and the new program, and information on the input signal utilized in the processing are stored in the verification recording unit 20; then, the processing is ended in the step S809.

As described above, there has been explained the processing procedure according to Embodiment 2, in which the program represented in the flowchart in FIG. 5 according to Embodiment 1 is executed after being divided into seven portions. The execution after dividing the program in such a manner as described above makes it possible to shorten the time for executing the program at a time. Because shortening the time of occupancy of the computing processing unit 90 makes it possible that the computing processing unit 90 rapidly responds to higher-priority processing, the processing procedure is largely significant. In the present embodiment, each divisional portion is executed every 0.4 ms and the whole processing is executed every 2.8 ms. The verification-period setting unit 19 can set the second period, which is the verification period, to a time interval in which the whole verification processing is executed.

In the flowcharts in FIGS. 6 through 13, for simplicity, explanations for determination of verification completion and setting or clearance of the verification completion flag have been omitted; however, these processing items can be added.

In Embodiment 2, the explanation for setting of the second period corresponding to the period of the input signal has been omitted; however, it is made possible to deal with that in a manner the same as that in Embodiment 1. In addition, the relationship between the first period and the second period is also the same as that in Embodiment 1.

In Embodiment 2, there has been explained the method in which the verification processing is executed by the verification apparatus 3 in a divided manner, so that the period of occupancy of the computing processing unit 90 for execution of each of the respective portions is shortened so as to reduce the software-execution load. The same effect can be obtained even when instead of executing the verification processing in the verification apparatus 3 in a divided manner, the verification processing is executed, as the processing of a normal priority, and the control processing in the vehicle-mounted control apparatus 2 is executed in interrupt processing. It is made possible that while the verification processing is executed in normal processing, the control processing by the vehicle-mounted control apparatus 2 is executed through interruption processing, at a required timing, and without delay. In addition, setting the second period, which is the execution period of the verification processing, to be longer than the first period, which is the control period, makes it possible to reduce the software-execution load on the computing processing unit 90 in total.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

DESCRIPTION OF REFERENCE NUMERALS

1: vehicle-mounted apparatus, 2: vehicle-mounted control apparatus, 3: verification apparatus, 11: sensor unit, 12: first program processing unit, 13: actuator unit, 14: program recording unit, 15: new program recording unit, 16: second program processing unit, 17: third program processing unit, 18: comparison determination unit, 19: verification-period setting unit, 20: verification recording unit,

What is claimed is:

1. A vehicle-mounted apparatus comprising:
   a sensor detector,
   a program recorder in which a current program for controlling a vehicle apparatus is recorded,
   a verification apparatus, and
   a first program processor that receives a signal to be outputted from the sensor detector, executes the current program read out from the program recorder, based on the signal, and then outputs a processing result to the vehicle apparatus, the verification apparatus comprising:
   a second program processor that receives the signal to be outputted from the sensor detector, executes a program the same as the current program, based on the signal, and then outputs a processing result,
   a third program processor that receives the signal to be outputted from the sensor detector, executes a new program obtained by adding a specification change to the current program, based on the signal, and then outputs a processing result,
   a comparison determinator that compares a first output portion obtained by removing output, in output of the third program processor, that is affected by the specification change with a second output portion, in output of the second program processor, that corresponds to the first output portion, and then determines identity therebetween, and
   a verification-period setter that sets a second period the same as or longer than a first period, wherein the first period is a first interval of time between successive performance of processing the current program by the first program processor, wherein the second period is a second interval of time between successive performance of processing the current program by the second program processor, and the second period is also the second interval of time between successive performance of the new program by the third program processor.

2. The vehicle-mounted apparatus according to claim 1, further comprising:
   the second program processor that receives the signal to be outputted from the sensor detector, executes the current program read out from the program recorder, based on the signal, and then outputs a processing result,
   a new program recorder in which the new program obtained by adding the specification change to the current program is recorded, and
   the third program processor that receives the signal to be outputted from the sensor detector, executes the new program read out from the new program recorder, based on the signal, and then outputs a processing result.

3. The vehicle-mounted apparatus according to claim 1, wherein the verification-period setter sets the second period in accordance with a software-execution load on the verification apparatus.

4. The vehicle-mounted apparatus according to claim 1, wherein in the case where the signal to be outputted by the sensor detector is a periodic signal, the verification-period setter sets the second period, based on a period of the signal from the sensor detector.

5. The vehicle-mounted apparatus according to claim 4, wherein the verification-period setter sets the second period to a value that is shorter than the period of the signal outputted by the sensor detector and is different from a period obtained by dividing the period by an integer.

6. The vehicle-mounted apparatus according to claim 1, wherein the verification-period setter sets the second period to a value different from a value integer-fold of the first period.

7. The vehicle-mounted apparatus according to claim 1, wherein in the case where the comparison determinator makes a determination denying identity, the verification apparatus stores a processing result of the second program processor, a processing result of the third program processor, and an input of a signal from the sensor detector in a verification recorder.

8. The vehicle-mounted apparatus according to claim 1, wherein the second period is gradually changed with respect to the first period.

9. The vehicle-mounted apparatus according to claim 1, wherein the vehicle-mounted apparatus is configured to receive a second new program, store the second new program in a memory storage, and responsive to a reception of an instruction, replace the new program in the program recorder with the second new program.

\* \* \* \* \*